US005742851A

United States Patent [19]
Sekine

[11] Patent Number: 5,742,851
[45] Date of Patent: Apr. 21, 1998

[54] INFORMATION PROCESSING SYSTEM HAVING FUNCTION TO DETECT FAULT IN EXTERNAL BUS

[75] Inventor: Yasuharu Sekine, Tokyo, Japan

[73] Assignee: NEC Corporation, Tokyo, Japan

[21] Appl. No.: 652,010

[22] Filed: May 23, 1996

[30] Foreign Application Priority Data

May 24, 1995 [JP] Japan ................................. 7-124959

[51] Int. Cl.$^6$ ....................................................... G06F 13/00
[52] U.S. Cl. ....................................................... 395/183.19
[58] Field of Search ........................ 395/182.01, 182.03, 395/183.19, 185.09, 181

[56] References Cited

U.S. PATENT DOCUMENTS

| | | | |
|---|---|---|---|
| 4,058,681 | 11/1977 | Imaizumi et al. | 179/15 |
| 4,159,534 | 6/1979 | Getson, Jr. et al. | 364/200 |
| 4,570,261 | 2/1986 | Maher | 371/16 |
| 4,654,857 | 3/1987 | Samson et al. | 371/68 |
| 4,974,144 | 11/1990 | Long et al. | 364/284 |
| 5,091,847 | 2/1992 | Herbermann | 393/575 |
| 5,270,699 | 12/1993 | Signaigo et al. | 340/825.01 |
| 5,404,465 | 4/1995 | Novakovich et al. | 395/325 |
| 5,421,002 | 5/1995 | Lee et al. | 395/575 |
| 5,452,443 | 9/1995 | Oyamada et al. | 395/182.08 |
| 5,557,753 | 9/1996 | Suenaga et al. | 395/287 |
| 5,630,056 | 5/1997 | Horvath et al. | 395/185.09 |
| 5,642,515 | 6/1997 | Jones et al. | 395/727 |

OTHER PUBLICATIONS

Nelson, Victor P., "Fault tolerant computing: fundamental concepts," Computer Magazine, vol. 23, issue 7, pp. 19–25, Jul. 1990.

Maxion, Roy A., "Dependability at the user interface," Fault tolerant Computing Symposiuym 1995, IEEE, pp. 528–535, 1995.

Tamir, Yuval, "Self-checking self-repairing computer noodes using the mirror processor," IEEE Journal of solid state circuits, vol. 27, No. 1, pp. 4–16, Jan. 1, 1992.

*Primary Examiner*—Robert W. Beausoliel, Jr.
*Assistant Examiner*—Norman M. Wright
*Attorney, Agent, or Firm*—Whitham, Curtis, Whitham & McGinn

[57] ABSTRACT

An information processing system having such a redundancy constitution as including a plurality of processors and an operation switching control unit for switching operations of operational processors and standby operations, in which each processor operating as the operational processor is provided with a fault detective data transmitting unit for transmitting a fault detective data to each processor operating as the standby processor through an external bus, while each processor operating as the standby processor is provided with a fault checking unit for checking whether a fault exists or not, in the external bus or in an interface, on the basis of the fault detective data, and the operation switching control unit fixes an operating state so as not to switch the operation between the operational and standby processors, even if detecting a fault in the processor operating as the operational processor, after a fault has been detected in the external bus or in the interface.

11 Claims, 4 Drawing Sheets

INFORMATION PROCESSING SYSTEM HAVING FUNCTION TO DETECT FAULT IN EXTERNAL BUS

BACKGROUNDS OF THE INVENTION

1. Field of the Invention

The present invention relates to an information processing system including a function to detect a fault occurring in an external bus, and more particularly to an information processing system which detects a fault in an external bus used for transferring data between processors of the information processing system having a redundancy constitution.

2. Description of the Related Art

An information processing system typically has a redundancy constitution in order to avoid interruption of operation caused by a trouble occurring in the system, the system including processors as an operational processor and a standby processor. In such information processing system, when a trouble occurred in the processor as the operational processor, the standby processor replaces the operational processor so as to continue the operation of the system.

Figure 4:
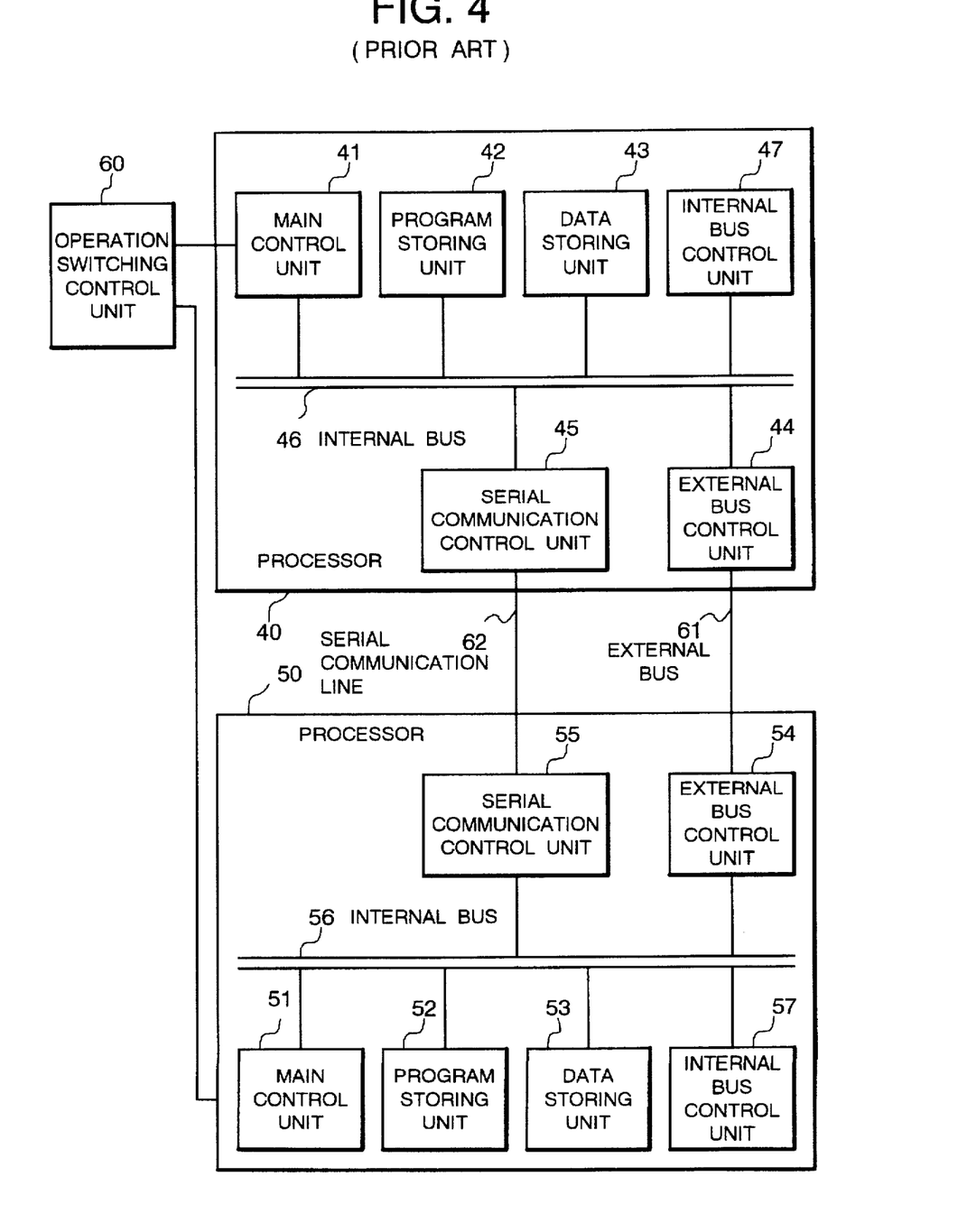
FIG. 4 is a block diagram showing a constitution of a conventional information processing system.

FIG. 4 is a block diagram showing an example of the above described redundancy constitution of the conventional information processing system.

As shown in FIG. 4, the information processing system comprises processors 40 and 50 for performing predetermined processing, and an operation switching control unit 60 for switching operation between the processors 40 and 50. FIG. 4 illustrates only particular constitution of the conventional example, and other constitution is omitted from the drawing.

The processors 40 and 50 have the same constitution as each other. One is regarded as an operational processor, while the other is regarded as a standby processor. The processors 40 and 50 are connected to each other through an external bus 61 serving as a data transfer bus for transferring data stored in the operational processor in order to back up the data from the operational processor to the standby processor, and a serial communication line 62 for informing the operational processor of an operating sate of the standby processor.

The processors 40 and 50 comprises main control units 41 and 51 for performing various arithmetic processing as well as controlling the overall operations of the processors, program storing units 42 and 52 for storing programs of controlling operating steps, data storing units 43 and 53 for storing data bases, external bus control units 44 and 54 for controlling data transfer between the processors 40 and 50, serial communication control units 45 and 55 for controlling serial communication between the processors 40 and 50, and internal bus control units 47 and 57 for controlling internal buses 46 and 56 within the respective processors 40 and 50.

In the case where the processor 40 is regarded as the operational processor and the processor 50 is regarded as the standby processor, when updating the content of the data storing unit 43 by performing a predetermined processing, the main control unit 41 of the operational processor 40 updates the content of the data storing unit 53 similarly to the data storing unit 43 through access to the data storing unit 53 of the standby processor 50. Thus, the data is supported as a back-up data.

When a fault occurred in the operational processor 40, the operation switching control unit 60 switches the processor 50 from the standby processor to the operational processor and also switches the processor 40 from the operational processor to the standby processor in accordance with the operating state of the operational processor 40. In the case where a fault also exists in the standby processor 50, however, switching between the operational and standby processors are of no use. In this case, if the fault in the operational processor 40 is too large to continue the processing operation, it is necessary to interrupt the processing operation performed by the information processing system and to eliminate the faults in the processors 40 and 50.

When a fault occurred in the external bus 61 or in the external bus control unit 54 of the standby processor 50, the main control unit 41 of the operational processor 40 detects a bus error when it gains access to the external bus 61 in order to update the content of the data storing unit 53 of the standby processor 50. In this case, the main control unit 41 of the processor 40 operating as the operational processor which possesses an access right to the bus, detects the bus error and notifies the operation switching control unit 60 of the occurrence of the fault. Accordingly, although the fault actually occurred in the external bus 61 or in the standby processor 50, the operation switching control unit 60 erroneously tacks it for the fault having occurred in the operational processor 40 and switches the operational processor from the processor 40 to the processor 50.

As described above, in the conventional information processing system, when the error occurred in the external bus or in the external bus control unit of the standby processor, the fault is regarded as the fault existing in the operational processor, so that the operational processor is switched. In this case, however, because there actually occurred no error in the operational processor, switching operation of the processor is naturally unnecessary.

Further, if the switching operation of the processor is performed, because the fault exists in the external bus or in the external bus control unit of the standby processor, the operational processor is switched under such a condition that the update data at the time of detecting the bus error is not stored in the data storing unit of the standby processor. That is to say, the standby processor is switched to the operational processor without the up-to-date backup of the data base, thereby to run the information processing system, which results in a malfunction of the system.

Since the fault existing in the external bus or in the external bus control unit of the standby processor is detected for the first time at the time when the operational processor gains access to the external bus in order to back up the data from the operational processor to the standby processor, the detection of the fault is unfavorably late.

SUMMARY OF THE INVENTION

It is a first object of the present invention to judge a position where a trouble occurred, i.e., whether a fault occurred in an operational processor, or in an interface or a standby processor, by performing detection of the fault via communication paths separately from detection of the fault not via communication paths, and to adopt appropriate countermeasures against the fault.

A second object of the present invention is, in addition to the first object, to prevent the operational processor from being unnecessarily switched when a fault does not exists in the operational processor but exists only in the interface or in the standby processor.

A third object of the present invention is, in addition to the second object, to prevent the standby processor from being switched to the operational processor so as to take over the operation of the system under such a condition that the data base in the standby processor is not updated.

A fourth object of the present invention is to find occurrence of a fault without waiting for the data base being backed up from the operational processor to the standby processor, by detecting the fault via the communication paths at the timing independent of the fault detection not via the communication paths.

According to one aspect of the invention, an information processing system having such a redundancy constitution as including a plurality of processors, some of which are used as operational processors and others are used as standby processors, and an operation switching control unit for switching operations between the operational processors and the standby processors, in order to detect some fault in external buses connecting said processors, wherein said processor operating as the operational processor comprising a fault detective data transmitting means for transmitting a fault detective data to each processor operating as the standby processor through said external bus;

said processor operating as the standby processor comprising a fault checking means for checking whether a fault exists or not, in said external bus or in an interface corresponding to said external bus, on the basis of the fault detective data received from said fault detective data transmitting means of said processor operating as the operational processor through said external bus; and after a fault has been detected in said external bus or in the interface corresponding to said external bus by said processor operating as the standby processor, said operation switching control unit does not switch the operation between the operational and standby processors, even if detecting a fault in said processor operating as the operational processor.

In the preferred construction, further comprises a communication line connecting said processors differently from said external bus, wherein the fault checking means of said processor operating as the standby processor sends a notice of the occurrence of the fault to said processor operating as the operational processor through said communication line when detecting a fault existing in said external bus or in the interface corresponding to said external bus, the processor operating as the operational processor sends the notice to said operation switching control unit upon receipt of the notice from said processor operating as the standby processor, and the operation switching control unit does not switch the operation between the operational and standby processors after receipt of the notice from said processor operating a the operational processor, even if detecting a fault in said processor operating as the operational processor.

In another preferred construction, the fault detective data transmitting means of said processor operating as the operational processor and said fault checking means of said processor operating as the standby processor are both main control means for executing various arithmetic processing by a program control in said processors, said main control means operating as said fault detective data transmitting means or said fault checking means according to the control of a predetermined program when said processors are respectively fixed as the operational processor and the standby processor by said operation switching control unit.

In another preferred construction, the said fault detective data transmitting means of said processor operating as the operational processor and said fault checking means of said processor operating as the standby processor are both main control means for executing various arithmetic processing by a program control in said processors, said main control means operating as said fault detective data transmitting means or said fault checking means according to the control of a predetermined program when said processors are respectively fixed as the operational processor and the standby processor by said operation switching control unit, the fault checking means of said processor operating as the standby processor possesses the same data as the fault detective data transmitted by said fault detective data transmitting means of said processor operating as the operational processor, compares said data with the fault detective data received from said fault detective data transmitting means, and judges that a fault exists in said external bus or in the interface corresponding to said external bus when the both data are out of accord with each other.

Also, the fault detective data transmitting means of said processor operating as the operational processor regularly transmits the fault detective data to said processor operating as the standby processor, independently of the other processing, and the fault detective data checking means of said processor operating as the standby processor regularly checks the fault detective data transmitted from said fault detective data transmitting means.

According to another aspect of the invention, in an information processing system comprising such a redundancy constitution as including a plurality of processors, some of which are used as operational processors and others are used as standby processors, and an operation switching control unit for switching operations between the operational processors and the standby processors, a method of detecting some fault in external buses connecting said processors, comprising the steps of:

a first step of said processor operating as the operational processor transmitting the fault detective data to said processor operating as the standby processor through said external bus;

a second step of said processor operating as the standby processor checking whether a fault exists or not in said external bus or in the interface corresponding to said external bus, on the basis of the fault detective data received from said fault detective data transmitting means of said processor operating as the operational processor through said external bus; and a third step of said operation switching control unit fixing an operating state so as not to switch the operation between said processors, even if detecting a fault in said processor operating as the operational processor, after a fault has been detected in said external bus or in the interface corresponding to said external bus by said processor operating as the standby processor.

In the preferred construction, the first and second steps are repeated regularly at a predetermined period.

In another preferred construction, in said second step, when the same data stored beforehand in said processor operating as the standby processor as the fault detective data issued by said processor operating as the operational processor is compared with the fault detective data received from said fault detective data transmitting means, if the both data are out of accord with each other, it is judged that a fault exists in said external bus or in the interface corresponding to said external bus.

In the above-mentioned construction, comprises, between said second and third steps, a fourth step of said processor operating as standby processor sending the notice of the occurrence of the fault to said processor operating as the operational processor through said communication line when detecting a fault existing in said external bus or in the interface corresponding to said external bus, and a fifth step of said processor operating as the operational processor sending the notice to said operation switching control unit upon receipt of the notice from said processor operating as the standby processor, wherein, in the third step, an operating state is fixed so as not to switch the operation between the operational and standby processors after receipt of the notice from said processor operating as the operational processor, even if a fault is detected in said processor operating as the operational processor.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
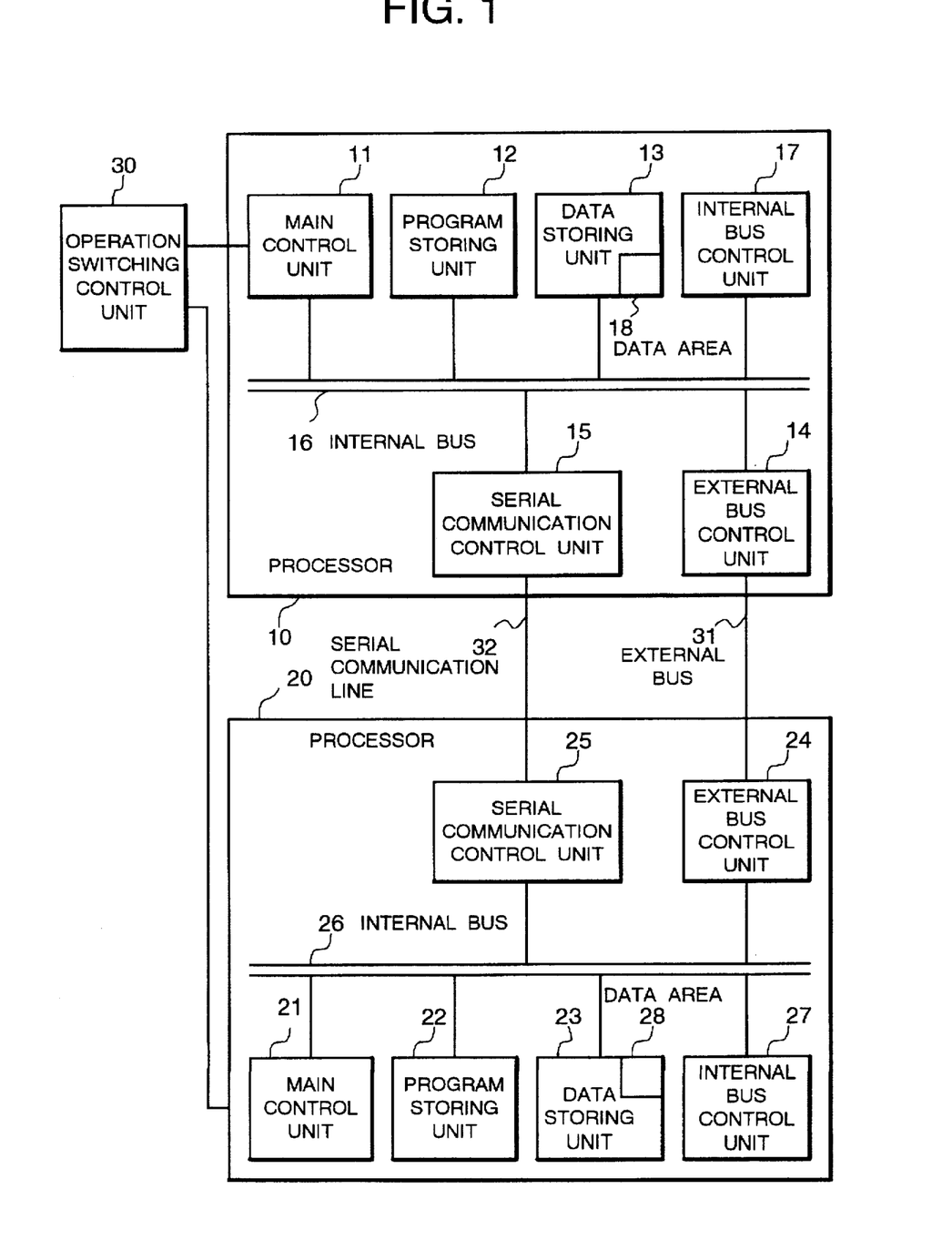
FIG. 1 is a block diagram showing a constitution of an information processing system according to an embodiment of the present invention.

A preferred embodiment will be described with reference to the accompanying drawings. FIG. 1 is a block diagram showing a constitution of an information processing system according to an embodiment of the present invention.

As illustrated in FIG. 1, the information processing system comprises processors 10 and 20 for performing an arithmetic processing, and an operation switching control unit 30 for switching operations of the processors 10 and 20. The processors 10 and 20 have the same constitution as each other. One is regarded as an operational processor, while the other is regarded as a standby processor. These two processors 10 and 20 are connected to each other through an external bus 31 serving as a transfer bus for transferring data stored in the operational processor in order to back up the data from the operational processor to the standby processor, and a serial communication line 32 for informing the operational processor of an operating state of the standby processor.

The processors 10 and 20 comprise main control units 11 and 21 for executing various arithmetic processing as well as controlling the overall operations of the processors, program storing units 12 and 22 for storing programs of controlling operating steps, data storing units 13 and 23 for storing data bases, external bus control units 14 and 24 for controlling data transfer between the processors 10 and 20, serial communication control units 15 and 25 for controlling serial communication between the processors 10 and 20, and internal bus control units 17 and 27 for controlling internal buses 16 and 26 within the respective processors 10 and 20. FIG. 1 shows only particular constitution in the embodiment, while the other constitution is not illustrated therein.

The main control units 11 and 21 are realized by a CPU controlled by a program. The main control units 11 and 21 execute various arithmetic processing depending on the purpose of the use of the processors 10 and 20, and reflect the content of the update within the data storing unit of the operational processor in the data storing unit of the standby processor when executing processing such as a data edit by the operational processor, thereby to support the content of the data storing unit of the operational processor in the standby processor as a backup data. The main control units 11 and 21 examine the state of the belonging processors so as to notify the operation switching control unit 30 of the fault in case of detecting a fault. Further, the units 11 and 21 individually examine whether a fault exists in the external bus 31 or in the external bus control unit 14 or 24 of the standby processor for controlling data transfer, and whether a fault exists in the serial communication line 32 or in the serial communication control unit 15 or 25 of the standby processor.

The detection of the fault in the external bus 31, or in the external bus control unit 14 or 24 of the standby processor is performed by sending a predetermined fault detective data from the operational processor to the standby processor. The fault detective data is a single or a plurality of data determined beforehand. The data has the minimum content necessary for the detection of the fault, which is arbitrarily determined.

The main control units 11 or 21 of the operational processor sends the fault detective data to the data storing unit 23 or 13 of the standby processor through the external bus 31 at a predetermined period (for example, at a period of T) regularly. The main control unit 21 or 11 of the standby processor regularly reads out the fault detective data written in the data storing unit 23 or 13 of the standby processor, so as to judge the correctness of the transfer. More specifically, the main control units 11 and 21 of the respective processors 10 and 20 issue the same fault detective data. Accordingly, if the fault detective data written in the data storing unit 23 or 13 of the standby processor is the same as that one issued by the main control unit 21 or 11 of the standby processor, this fault detective data is recognized to have been transferred correctly.

Here, it is not always necessary to conform the period at which the main control unit 21 or 11 of the standby processor reads out the fault detective data from the data storing unit 23 or 13 of the standby processor, to the period at which the main control unit 11 or 21 of the operational processor issues the fault detective data. Reading of the fault detective data, or checking by the fault detective data can be performed, for example, at the period of m×T (where T is a natural number). The main control unit 21 or 11 of the standby processor erases the data after reading out the fault detective data from the data storing unit 23 or 13 of the standby processor.

In the above mentioned processing, it can be judged whether the fault has occurred in the external bus 31 or in the external control unit 14 or 24 of the standby processor. In other words, if the fault detective data has been transferred correctly, it is obvious that no fault exists in the external bus 31 as well as in the external control unit 14 or 24 of the standby processor.

A fault in the serial communication line 32, or in the serial communication control unit 25 or 15 of the standby processor can be detected by the polling over the serial communication control unit 25 or 15 of the standby processor from the serial communication control unit 15 or 25 of the operational processor, and checking response from the serial communication control unit 25 or 15 of the standby processor. In case of a normal response returned from the serial communication control unit 25 or 15 of the standby processor, it can be judged that no fault exists in the serial communication line 32 as well as in the serial communication control unit 25 or 15 of the standby processor. While, in case of no response or an abnormal response returned therefrom as the result of polling from the operational processor, it can be judged that a fault exists in the serial communication line 32, or in the serial communication control unit 25 or 15 of the standby processor.

The program storing units 12 and 22 are realized by a memory such as a RAM or a storage such as a magnetic disk unit. The units 12 and 22 store control programs for operating the processors 10 and 20.

The data storing units 13 and 23 are realized by a memory such as a RAM or a storage such as a magnetic disk unit. The units 13 and 23 store the resultant data obtained from various processing by the processors 10 and 20. In the case where the content of the data storing unit 13 or 23 of the operational processor is updated, the content of the data storing unit 23 or 13 of the standby processor is similarly updated, with the data backed up.

The data storing units 13 and 23 are provided with specified data areas 18 and 28 for storing the fault detective data. The fault detective data delivered from the main control unit 11 or 21 of the operational processor is stored in the data area 28 or 18 in the data storing unit 23 or 13 of the standby processor, then to be read out by the main control unit 21 or 11 of the standby processor.

The external bus control units 14 and 24 are realized by a CPU controlled by a program. The unit 14 or 24 of the operational processor sends the data stored in the data storing unit 13 or 23 of the operational processor and the fault detective data regularly issued from the main control unit 11 or 21 of the operational processor, to the standby processor through the external bus 31, according to the control of the main control unit 11 or 21 of the operational processor.

The serial communication control units 15 and 25 are realized by a CPU controlled by a program. When the main control unit 11 or 21 detects a fault in the external bus 31, or in the external bus control unit 24 or 14 of the standby processor by the processing of the fault detective data, the serial communication control unit 25 or 15 notifies the operational processor of the existing fault via the serial communication line 32. The serial communication control unit 15 or 25 of the operational processor polls the serial communication control unit 25 or 15 of the standby processor periodically. As mentioned above, based on the response from the serial communication control unit 25 or 15 of the standby processor, the main control unit 11 or 21 can judge whether a fault exists or not in the serial communication line 32.

The internal bus control units 17 and 27 are realized by a CPU controlled by a program, for controlling operations with the use of the internal buses 16 and 26, such as data transfer between components within the respective processors 10 and 20.

This time, an operation of the embodiment will be described with reference to the flow charts of FIGS. 2 and 3.

The information processing system of this embodiment is similar to the conventional information processing system with respect to an operation of backing up the data by reflecting the result of the data edit by the operational processor in the standby processor, and an operation of switching the operational processor 10 or 20 by the control of the operation switching control unit 30 after informing the operation switching control unit 30 of the fault if a fault occurred in the operational processor.

In the case where the processor 10 is regarded as an operational processor and the processor 20 is regarded as a standby processor, the main control unit 11 of the operational processor 10, when updating the content of the data storing unit 13 of the operational processor according to a predetermined processing, also updates the content of the data storing unit 23 of the standby processor 20 similarly to that of the data storing unit 13 through access to the unit 23 of the processor 20, thereby to back up the data.

The main control unit 11 of the operational processor 10 monitors the operating state of the processor 10, and notifies the operation switching control unit 30 of the fault if a fault occurred. The main control unit 11 waits for execution of the operational switching control in accordance with the judgment of the operation switching control unit 30. The main control unit 21 of the standby processor 20 takes over the operation executed by the main control unit 11 of the processor 10 when the main control unit 21 of the standby processor 20 is newly appointed as an operational processor by the switching operation according to the control of the operation switching control unit 30.

Figure 2:
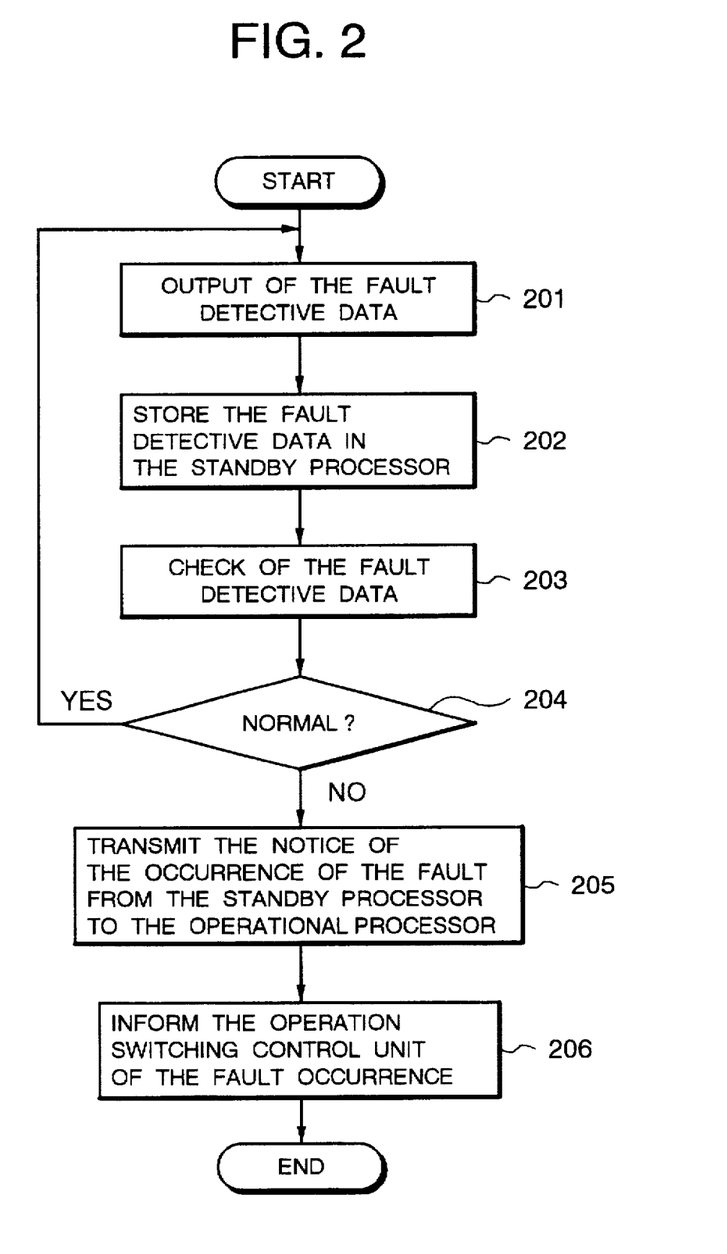
FIG. 2 is a flow chart showing an operation for examining existence of a fault in an external bus according to the embodiment.

The information processing system of this embodiment checks the existence of a fault in the external bus 31 or in the external bus control unit 24 of the standby processor 20, in the procedure illustrated in FIG. 2, independently of the operation mentioned above.

As an initial operation, the main control unit 11 of the operational processor 10 transmits the fault detective data regularly (Step 201) from the external bus control unit 14 to the external bus 31, so as to be stored in the data area 28 of the data storing unit 23 through the external bus control unit 24 of the standby processor 20 (Step 202).

The main control unit 21 of the standby processor 20 reads out the fault detective data stored in the data area 28 of the data storing unit 23 regularly, clears the data area 28, and checks whether the content of the fault detective data read out therefrom is in accordance with that of the fault detective data issued by the main control unit 11 (Step 203). If the fault detective data read out from the data storing unit 23 is normal, the main control unit 21 waits for the timing of reading out the next fault detective data without performing any processing (Step 204).

While, if the fault detective data read out from the data storing unit 23 is abnormal, the main control unit 21 sends the notice of the occurrence of the fault to the main control unit 11 of the operational processor 10 through the serial communication control unit 25, the serial communication line 32 and the serial communication control unit 15 (Steps 204 and 205).

Upon receipt of the notice of the occurrence of the fault from the main control unit 21 of the standby processor 20, the main control unit 11 of the operational processor 10 notifies the operation switching control unit 30 that a fault occurred in the external bus 31 or in the standby processor 20 (Step 206). In consideration of the possibility of the fault existing in the external bus control unit 14 of the operational processor 10, the main control unit 11 may notify the operation switching control unit 30 of the fault after confirming the existence of a fault in the operational processor 10.

Thus, the operation switching control unit 30 recognizes the fault having occurred in the external bus 31 or in the standby processor 20. Even if a fault occurred in the operational processor 10, unnecessary operational switching is avoided by setting a fault detective flag on the fault. The processor 20 can be prevented from taking over the operation with the data base before update.

Figure 3:
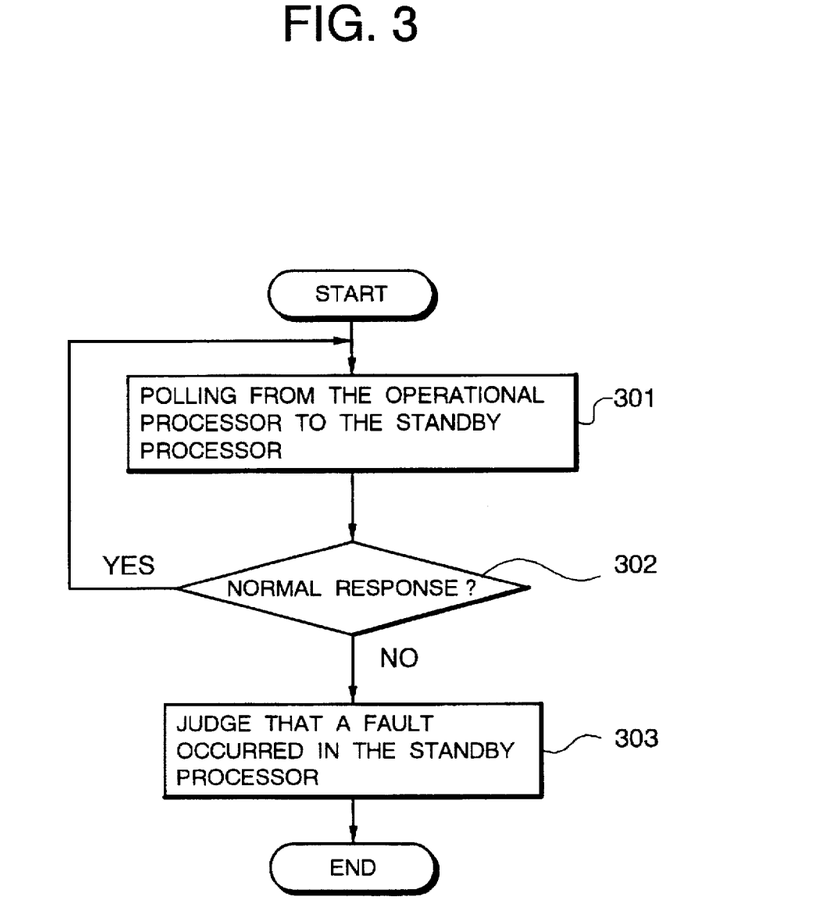
FIG. 3 is a flow chart showing an operation for examining existence of a fault in a serial communication line according to the embodiment.

Independently of the above operation, the existence of a fault is checked in the serial communication line 32 as well as in the serial communication control unit 25 of the standby processor 20 according to the procedure illustrated in FIG. 3.

At first, the serial communication control unit 15 regularly polls the serial communication control unit 25 of the standby processor 20 through the serial communication line 32 according to the control of the main control unit 11 of the operational processor 10 (Step 301). If the response from the serial communication control unit 25 is normal, the serial communication control unit 15 waits for the timing of the next polling (Step 302). If the response from the serial communication control unit 25 is abnormal, or no response is there, the main control unit 11 judges that a fault occurred in the serial communication line 32 or in the serial communication control unit 25 of the standby processor 20 (Steps 302 and 303).

These steps as mentioned above can improve the reliability in the notice from the standby processor 20 that the fault occurred. When there is some fear of a fault existing in the serial communication line 32 or in the serial communication control unit 25 of the standby processor 20, operational switching should not be always performed, but even if there is no notice of the fault occurrence from the standby processor 20, ordinal processing operation is once interrupted so as to take measures in a way such as checking the existence of the fault.

As mentioned above, fault detective processing by the use of the external bus as well as by the use of the serial communication line is executed independently of the fault detective processing by no use of these communication means. This makes it possible to determine the position of the trouble, by way of example, a trouble in the operational processor, a trouble in an interface, or a trouble in the standby processor, thereby to take appropriate countermeasures against the trouble.

Further, owing to the separate execution of the fault detection, if a fault occurred, the fault can be found soon without waiting for the data base being backed up.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An information processing system having such a redundancy constitution as including a plurality of processors, some of which are used as operational processors and others are used as standby processors, and an operation switching control unit for switching operations between the operational processors and the standby processors, in order to detect some fault in external buses connecting said processors, wherein said processor operating as the operational processor comprising a fault detective data transmitting means for transmitting a fault detective data to each processor operating as the standby processor through said external bus;

said processor operating as the standby processor comprising a fault checking means for checking whether a fault exists or not, in said external bus or in an interface corresponding to said external bus, on the basis of the fault detective data received from said fault detective data transmitting means of said processor operating as the operational processor through said external bus; and after a fault has been detected in said external bus or in the interface corresponding to said external bus by said processor operating as the standby processor, said operation switching control unit does not switch the operation between the operational and standby processors, even if detecting a fault in said processor operating as the operational processor.

2. An information processing system as set forth in claim 1, further comprising a communication line connecting said processors differently from said external bus, wherein said fault checking means of said processor operating as the standby processor sends a notice of the occurrence of the fault to said processor operating as the operational processor through said communication line when detecting a fault existing in said external bus or in the interface corresponding to said external bus, said processor operating as the operational processor sends the notice to said operation switching control unit upon receipt of the notice from said processor operating as the standby processor, and said operation switching control unit does not switch the operation between the operational and standby processors after receipt of the notice from said processor operating a the operational processor, even if detecting a fault in said processor operating as the operational processor.

3. An information processing system as set forth in claim 1, wherein said fault detective data transmitting means of said processor operating as the operational processor and said fault checking means of said processor operating as the standby processor are both main control means for executing various arithmetic processing by a program control in said processors, said main control means operating as said fault detective data transmitting means or said fault checking means according to the control of a predetermined program when said processors are respectively fixed as the operational processor and the standby processor by said operation switching control unit.

4. An information processing system as set forth in claim 1, wherein said fault checking means of said processor operating as the standby processor possesses the same data as the fault detective data transmitted by said fault detective data transmitting means of said processor operating as the operational processor.

compares said data with the fault detective data received from said fault detective data transmitting means, and judges that a fault exists in said external bus or in the interface corresponding to said external bus when the both data are out of accord with each other.

5. An information processing system as set forth in claim 1, wherein said fault detective data transmitting means of said processor operating as the operational processor and said fault checking means of said processor operating as the standby processor are both main control means for executing various arithmetic processing by a program control in said processors, said main control means operating as said fault detective data transmitting means or said fault checking means according to the control of a predetermined program when said processors are respectively fixed as the operational processor and the standby processor by said operation switching control unit, said fault checking means of said processor operating as the standby processor possesses the same data as the fault detective data transmitted by said fault detective data transmitting means of said processor operating as the operational processor, compares said data with the fault detective data received from said fault detective data transmitting means, and judges that a fault exists in said external bus or in the interface corresponding to said external bus when the both data are out of accord with each other.

6. An information processing system as set forth in claim 1, wherein said fault detective data transmitting means of said processor operating as the operational processor regularly transmits the fault detective data to said processor operating as the standby processor, independently of the other processing, and said fault detective data checking means of said processor operating as the standby processor regularly checks the fault detective data transmitted from said fault detective data transmitting means.

7. An information processing system as set forth in claim 1, further comprising a communication line connecting said processors differently from said external bus, and a fault checking means on said communication line for checking whether a fault exists or not, in said communication line or in the interface corresponding to said communication line, on the basis of the response from said processor operating as the standby processor, by regularly polling the same via said communication line, wherein said fault checking means of said processor operating as the standby processor sends a notice of the occurrence of the fault to said processor operating as the operational processor through said communication line when detecting a fault existing in said external bus or in the interface corresponding to said external bus, said processor operating as the operational processor sends the notice to said operation switching control unit upon receipt of the notice from said processor operating as the standby processor, and said operation switching control unit does not switch the operation between the operational and standby processors after receipt of the notice from said processor operating a the operational processor, even if detecting a fault in said processor operating as the operational processor.

8. In an information processing system comprising such a redundancy constitution as including a plurality of processors, some of which are used as operational processors and others are used as standby processors, and an operation switching control unit for switching operations between the operational processors and the standby processors, a method of detecting some fault in external buses connecting said processors, comprising the steps of:

a first step of said processor operating as the operational processor transmitting the fault detective data to said processor operating as the standby processor through said external bus;

a second step of said processor operating as the standby processor checking whether a fault exists or not in said external bus or in the interface corresponding to said external bus, on the basis of the fault detective data received from said fault detective data transmitting means of said processor operating as the operational processor through said external bus; and a third step of said operation switching control unit fixing an operating state so as not to switch the operation between said processors, even if detecting a fault in said processor operating as the operational processor, after a fault has been detected in said external bus or in the interface corresponding to said external bus by said processor operating as the standby processor.

9. A method of detecting some fault in external buses as set forth in claim 8, wherein said first and second steps are repeated regularly at a predetermined period.

10. A method of detecting some fault in external buses as set forth in claim 8, wherein in said second step, when the same data stored beforehand in said processor operating as the standby processor as the fault detective data issued by said processor operating as the operational processor is compared with the fault detective data received from said fault detective data transmitting means, if the both data are out of accord with each other, it is judged that a fault exists in said external bus or in the interface corresponding to said external bus.

11. A method of detecting some fault in external buses as set forth in claim 8, comprising, between said second and third steps, a fourth step of said processor operating as standby processor sending the notice of the occurrence of the fault to said processor operating as the operational processor through said communication line when detecting a fault existing in said external bus or in the interface corresponding to said external bus, and a fifth step of said processor operating as the operational processor sending the notice to said operation switching control unit upon receipt of the notice from said processor operating as the standby processor, wherein, in the third step, an operating state is fixed so as not to switch the operation between the operational and standby processors after receipt of the notice from said processor operating as the operational processor, even if a fault is detected in said processor operating as the operational processor.

* * * * *